United States Patent [19]

Saito et al.

[11] Patent Number: 5,001,006

[45] Date of Patent: Mar. 19, 1991

[54] MAGNETIC RECORDING MEDIUM

[75] Inventors: Shinji Saito; Hiroo Inaba, both of Kanagawa, Japan

[73] Assignee: Fuji Photo Film Co., Ltd., Kanagawa, Japan

[21] Appl. No.: 317,243

[22] Filed: Feb. 28, 1989

[30] Foreign Application Priority Data

Feb. 29, 1988 [JP] Japan ................................. 63-46325

[51] Int. Cl.$^5$ ............................................... G11B 23/00
[52] U.S. Cl. ................................... 428/323; 428/329; 428/694; 428/900
[58] Field of Search ................ 428/329, 323, 694, 900

[56] References Cited

U.S. PATENT DOCUMENTS

| | | | |
|---|---|---|---|
| 4,109,046 | 8/1978 | Hamman et al. | 428/694 |
| 4,259,392 | 3/1981 | Suzuki | 428/694 |
| 4,275,115 | 6/1981 | Noruse | 428/694 |
| 4,618,536 | 10/1986 | Morioka et al. | 428/323 |
| 4,643,941 | 2/1987 | Miyoshi et al. | 424/694 |
| 4,668,568 | 5/1987 | Fujiyama et al. | 428/694 |
| 4,687,704 | 8/1987 | Miyashi et al. | 428/694 |
| 4,759,979 | 7/1988 | Kasha et al. | 428/323 |
| 4,844,946 | 7/1989 | Komatsu et al. | 428/694 |
| 4,865,924 | 9/1989 | Saito et al. | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium is disclosed, comprising a nonmagnetic support having thereon a lower magnetic layer comprising ferromagnetic particles and binders and an upper magnetic layer comprising ferromagnetic particles and binders in this order, wherein the upper magnetic layer contains (a) an abrasive agent having a Mohs' hardness of 6 or more and an average particle diameter of 0.45 $\mu$m or more and (b) an abrasive agent having a Mohs' hardness of 6 or more and an average particle diameter of 0.25 $\mu$m or less.

8 Claims, No Drawings

MAGNETIC RECORDING MEDIUM

FIELD OF THE INVENTION

This invention relates to a magnetic recording medium comprising a non-magnetic support and a magnetic layer, and more particularly it relates to a magnetic recording medium having at least two magnetic layers.

BACKGROUND OF THE INVENTION

Magnetic recording media are widely used as recording tapes, video tapes or floppy disks. A magnetic recording medium is fundamentally comprised of a non-magnetic support having laminated thereon a magnetic layer containing ferromagnetic particles dispersed in a binder.

High levels of various characteristics such as electromagnetic characteristics, running durability and running efficiencies are necessary for a magnetic recording medium. Specifically, an audio tape must have a high capability for reproducing original sounds in order to produce a high quality recordation and reproduction of recorded music. In addition, a video tape must have excellent electromagnetic characteristics in order to produce an excellent reproduction of original images.

As described above, it is necessary for a magnetic recording medium to have not only excellent electromagnetic characteristics, but also excellent running durability. In this connection, an abrasive agent generally plays an important role in order to obtain good running durability. Such an abrasive agent is distributed wholly in a magnetic layer, and a part of the abrasive agent is present on the surface of the magnetic layer. When a magnetic recording medium runs, it makes contact with various running parts such as a tape head. The abrasive agent present on the surface of the magnetic layer exhibits abrasive effects at the contact surface between the surface of the magnetic layer and the head. Accordingly, it is possible to improve running durability by incorporating an abrasive agent in a magnetic recording medium. However, when an abrasive agent is added in the magnetic layer, only a small portion of that abrasive agent is present on the surface of the magnetic layer, and it is difficult to obtain sufficiently excellent running durability with such a small portion of the abrasive agent on the surface. Therefore, it would appear at first glance that more abrasive agent should be added to increase its surface presence in order to improve running durability. But, when an increased amount of the abrasive agent is added to improve running durability, the content of ferromagnetic particles decreases and electromagnetic characteristics deteriorate. Moreover, when abrasive agents having a large particle diameter are used, the abrasive agents are likely to excessively extrude on the surface of the magnetic layer. Further, experiments have been conducted using abrasive agents having a large particle diameter and those having a small particle diameter in combination, but sufficiently excellent electromagnetic characteristics have not yet been obtained. See JP-A-57-162129 and JP-A-58-85931. (The term "JP-A" as used herein means an "unexamined published Japanese patent application").

In order to solve the above problem, it has been proposed that a magnetic layer be divided into two magnetic layers: A lower layer and an upper layer. According to this proposal, the upper layer would exhibit excellent running durability and the lower layer would have excellent electromagnetic characteristics, whereby running durability would be improved without deteriorating electromagnetic characteristics. See JP-A-58-200425. That is, it was designed to improve electromagnetic characteristics by making the content of ferromagnetic particles large without adding additives such as abrasive agents into the lower layer, and it was designed to improve running durability by (i) making the thickness of the upper layer from 0.5 to 1.5 $\mu$m, and (ii) using an abrasive agent which has maximum particle diameter not exceeding the thickness of the upper layer.

By providing two magnetic layers as described above, a magnetic recording medium's electromagnetic characteristics as well as its running durability can actually be improved to some extent. But, despite this actual improvement, running durability is still not sufficiently satisfactory.

SUMMARY OF THE INVENTION

An object of this invention is to provide a magnetic recording medium such as an audio tape or a video tape having improved electromagnetic characteristics and running durability.

To achieve this and other objects which will become apparent from the specification, the present invention provides a magnetic recording medium comprising a non-magnetic support having thereon an lower magnetic layer comprising ferromagnetic particles and binders and an upper magnetic layer comprising ferromagnetic particles and binders in this order, wherein the upper magnetic layer contains (a) an abrasive agent having a Mohs' hardness of 6 or more and an average particle diameter of 0.45 $\mu$m or more and (b) an abrasive agent having (a Mohs' hardness of 6 or more and an average particle diameter of 0.25 $\mu$m or less.

The preferred embodiments of the magnetic recording medium of this invention include the following:

(1) The above-described magnetic recording medium, wherein the upper magnetic layer has a thickness of from 0.1 to 1.5 $\mu$m.

(2). The above-described magnetic recording medium, wherein the upper magnetic layer has a thickness of from 0.2 to 1.0 $\mu$m.

(3). The above-described magnetic recording medium, wherein the upper magnetic layer contains (a) an abrasive agent having Mohs' hardness of 6 or more and an average particle diameter of from 0.5 to 1.0 $\mu$m, and (b) an abrasive agent having Mohs' hardness of 6 or more and an average particle diameter of 0.2 $\mu$m or less.

(4). The above-described magnetic recording medium wherein the weight ratio of abrasive agents contained in the upper magnetic layer having an average particle diameter of 0.45 $\mu$m or more and those contained in the upper magnetic layer having an average particle diameter of 0.25 $\mu$m or less is between 1/5 and 5/1.

(5). The above-described magnetic recording medium wherein the content of abrasive agents having a Mohs' hardness of 6 or more, contained in the upper magnetic layer is from 0.5 to 30 parts by weight per 100 parts by weight of ferromagnetic particles contained in the upper magnetic layer.

(6). The magnetic recording medium wherein the lower magnetic layer contains no abrasive agents.

As described above, the magnetic recording medium of this invention has at least two magnetic layers, and the second (upper) magnetic layer contains (a) abrasive agents having a Mohs' hardness of 6 or more and an average particle diameter of 0.45 μm or more, and (b) abrasive agents having a Mohs' hardness of 6 or more and an average particle diameter of 0.25 μm or less.

In order to maintain electromagnetic characteristics the lower magnetic layer of this invention preferably is thicker than the upper magnetic layer and has a high packing density of ferromagnetic particles. In addition, the lower magnetic layer has excellent surface smoothness. The excellent smoothness of the lower layer permits the upper magnetic layer to also have excellent surface smoothness. Therefore, even though the upper magnetic layer contains abrasive agents having a comparatively large average particle diameter (which is particularly effective for securing running durability), the electromagnetic characteristics of the magnetic recording medium hardly deteriorate. Further, the upper magnetic layer preferably is an extremely thin layer, and although abrasive agents which have rather large average particle diameter are used therein, they are present only on or near the surface of the magnetic layer, and therefore do not cause the deterioration of electromagnetic characteristics of the magnetic layer as a whole.

That is, it is believed that the magnetic recording medium of this invention can maintain surface smoothness of the magnetic layer to some extent and at the same time has microscopic unevenness formed on the surface of the magnetic layer. Such a magnetic layer can be obtained because according to a preferred method for forming the magnetic recording medium of this invention, an extremely thin upper magnetic layer is coated on top of the lower magnetic layer while the lower magnetic layer is wet. As will be explained below, this simultaneously multiple coating is very effective.

Accordingly, it can be said that the magnetic recording medium of this invention is excellent in both electromagnetic characteristics and running durability.

DETAILED DESCRIPTION OF THE INVENTION

The magnetic recording medium of this invention is comprised of a non-magnetic support having thereon at least two magnetic layers containing ferromagnetic particles dispersed in a binder.

The non-magnetic supports for use in this invention include a film or a sheet of polyesters such as polyethylene terephthalate (PET) or polyethylene naphthalate; polyolefins such as polypropylene; cellulose derivatives such as cellulose triacetate or cellulose diacetate; vinyl resins such as polyvinyl chloride or polyvinylidene chloride, synthetic resins such as polycarbonate, polyamide, polyamidoimide or polyimide; foils of non-magnetic metals such as aluminum or copper; metal foils such as stainless foil; paper; and a ceramic sheet.

The supports can have a thickness of from 2.5 to 100 μm and preferably from 3 to 80 μm.

This invention seeks to improve running durability of a magnetic recording medium. As described above, in the case when an additive amount of an abrasive agent is increased to improve running durability, the content of ferromagnetic particles decreases. Also in the case when an abrasive agent having a large particle diameter is used, the abrasive agent is likely to extrude on the surface of a magnetic layer. In either of these cases, however, running durability is improved only at the expense of deterioration of electromagnetic characteristics. Additionally, even though abrasive agents having different average particle diameter are used in combination, the significant deterioration of electromagnetic characteristics cannot be prevented. Even if multiple magnetic layers are used in the above-described cases running durability still is not satisfactory.

However, running durability can indeed be improved without deteriorating electromagnetic characteristics by using the magnetic recording medium of this invention.

The magnetic recording medium of this invention is comprised of a non-magnetic support having thereon a lower and a upper magnetic layer, in this order. That is, the magnetic recording medium of this invention has at least two magnetic layers and the upper magnetic layer contains (a) abrasive agents having a Mohs' hardness of 6 or more and having an average particle diameter of 0.45 μm or more and preferably from 0.5 to 1.0 μm and (b) abrasive agents having a Mohs' hardness of 6 or more and having an average particle diameter of 0.25 μm or less and preferably from 0.05 to 0.2 μm.

In this invention, the lower magnetic layer is thicker than the upper magnetic layer in order to maintain high electromagnetic characteristics. The lower layer has a high packing density of ferromagnetic particles and has an excellent surface smoothness. It is desirable not to add an abrasive agent into the lower magnetic layer in order to obtain excellent surface smoothness.

The upper magnetic layer of this invention is coated on the above-described lower magnetic layer in an extremely low thickness and contains (a) an abrasive agent having comparatively large average particle diameter and (b) an abrasive agent having comparatively small average particle diameter.

An abrasive agent having a small average particle diameter hardly deteriorates electromagnetic characteristics, but is not very effective for improving running durability. However, abrasive agent having a large particle diameter has the opposite effect: running durability is greatly improved but electromagnetic characteristics suffer.

On the other hand, in the case when a magnetic layer is made to have a multiple layer structure, that is, two layers as in this invention, running durability can be improved without deteriorating electromagnetic characteristics. Moreover, by making the surface of the lower magnetic layer extremely smooth, the surface of the upper magnetic layer can also be made extremely smooth. The simultaneous multicoating method referred to hereinafter is preferably employed to obtain an extremely thin upper magnetic layer having an extremely smooth surface.

As described above, the magnetic layer of this invention (comprised of the lower and upper magnetic layers) has an extremely smooth surface. Accordingly, even though the upper magnetic layer contains an abrasive agent having a comparatively large average particle diameter (which is effective particularly for improving running durability), electromagnetic characteristics hardly deteriorate. The upper magnetic layer is extremely thin, and although an abrasive agent having a comparatively large particle diameter is contained therein, the abrasive agent is present only on or near the surface of the magnetic layer. Thus, the electromagnetic characteristics of the whole magnetic layer (the lower and upper layers) are hardly adversly affected.

The upper magnetic layer of this invention contains (a) an abrasive agent having a Mohs' hardness of 6 or more and an average particle diameter of 0.45 μm or more and (b) an abrasive agent having a Mohs' hardness of 6 or more and an average particle diameter of 0.25 μm or less. It is believed that the different abrasive agents in combination maintain the excellent surface smoothness of the magnetic layer as a whole and at the same time form a slight unevenness. Such a surface smoothness is obtained because the extremely thin upper magnetic layer is coated on top of the lower magnetic layer while the lower magnetic layer is wet. In this instance, the above-described simultaneous multiple coating method is very effective.

Accordingly, the magnetic recording medium of this invention is excellent both in electromagnetic characteristics and running durability.

The thickness of the lower magnetic layer is preferably from 1 to 4 μm and particularly preferably from 2 to 3 μm, and the thickness of the upper magnetic layer is preferably 1.5 μm or less and more preferably from 0.1 to 1.0 μm.

The abrasive agents contained in the upper magnetic layer of this invention include those having a Mohs' hardness of 6 or higher, such as $\alpha$-$Al_2O_3$ (Mohs' hardness 9), $TiO_2$ (Mohs' hardness 6.5), $SiO_2$ (Mohs' hardness 7), $SnO_2$ (Mohs' hardness 6.5), $Cr_2O_3$ (Mohs' hardness 9), SiC (Mohs' hardness 9) and TiC (Mohs' hardness 9). $\alpha$-$Al_2O_3$ and $Cr_2O_3$ are preferred.

The abrasive agents contained in the upper magnetic layer have a Mohs' hardness of 6 or more; one type (a) has an average particle diameter of 0.45 μm or more (preferably from 0.5 to 1.0 μm) and another type (b) has an average particle diameter of 0.25 μm or less (preferably from 0.05 to 0.2 μm).

It is preferred that the weight ratio of the abrasive agent having an average particle diameter of 0.45 μm or more and that having an average particle diameter of 0.25 μm or less be generally from 1/5 to 5/1 and particularly from ⅓ to 3/1 in order to ensure both high electromagnetic characteristics and good running durability.

The amount of the abrasive agent contained in the upper magnetic layer is preferably from 0.5 to 30 parts by weight and particularly from 1 to 15 parts by weight, per 100 parts by weight of the ferromagnetic particles contained in the upper magnetic layer.

In the magnetic recording medium of this invention, the above-described properties of the upper magnetic layer provide sufficient running durability, and therefore it is preferred that the lower magnetic layer contain a lesser amount of the abrasive agent than the upper magnetic layer. Indeed, it is even more preferred that the lower magnetic layer contain no abrasive agent, thereby further ensuring excellent electromagnetic characteristics.

The resins for use as binders in forming a magnetic layer of the present invention are not particularly limited. The resins which are preferably used in the present invention have a number average molecular weight of preferably from 1,000 to 200,000 and more preferably from 10,000 to 100,000. Such binder resins include vinyl chloride type copolymers (e.g., vinyl chloride/vinyl acetate copolymer, vinyl chloride/vinyl acetate/vinyl alcohol copolymer, vinyl chloride/vinyl acetate/acrylic acid copolymer, vinyl chloride/vinylidene chloride copolymer, vinyl chloride/acrylonitrile copolymer, ethylene/vinyl acetate copolymer); cellulose derivatives such as nitrocellulose resins; acrylic resins; polyvinyl acetal resins; polyvinyl butyral resins; epoxy resins; phenoxy resins; and polyurethane type resins (e.g., polyester type polyurethane resins, polyether type polyurethane resins, polycarbonate polyurethane resins). Furthermore, polar groups such as a hydroxyl group, a carboxylic group, an epoxy group, a metal sulfonate group, a phosphoric acid group or a phosphate group may be contained in these resins. The amount of the polar groups contained in these resins is preferably from $1 \times 10^{-2}$ to $1 \times 10^{-6}$ mol per gram of the resin.

The above-mentioned resins may be used alone or in combination.

The amount of the resins which can be used in the present invention is preferably from 5 to 50 parts by weight and more preferably from 10 to 30 parts by weight, per 100 parts by weight of the ferromagnetic particles.

When a hardening agent is used, polyisocyanate compounds are generally the agent of choice. The polyisocyanate compounds are generally selected from those that are used as components of hardening agents such as polyurethane type resins. The examples of polyisocyanate compounds include a reaction product of tolylene diisocyanate and 1 mol of trimethylolpropane (e.g., "Desmodule L-75", made by Bayer Co., Ltd.); a reaction product of 3 mols of diisocyanate such as xylylene diisocyanate or hexamethylene diisocyanate and 1 mol of trimethylolpropane; a buiret adduct of 3 mols of hexamethylene diisocyanate; isocyanurate compound of 5 mols of tolylene diisocyanate; an isocyanurate adduct of 3 mols of tolylene diisocyanate and 2 mols of hexamethylene diisocyanate; and polymer of isophorone diisocyanate and diphenylmethane diisocyanate.

When a hardening treatment is conducted by electron beam radiation, a compound having reactive double bonds (e.g., urethane acrylate) as described in JP-A-59-58623 and JP-A-59-71130 can be preferably used.

The total weight amount of resin components and hardening agents is preferably from 5 to 40 parts by weight, and more preferably from 10 to 20 parts by weight, per 100 parts by weight of ferromagnetic particles.

The examples of ferromagnetic particles for use in this invention include metal oxide type ferromagnetic particles such as $\gamma$-$Fe_2O_3$, ferromagnetic particles containing different metals, metal oxides such as $\gamma$-$Fe_2O_3$ containing other components such as cobalt, and ferromagnetic metal particles containing ferromagnetic metals such as iron, cobalt or nickel.

When ferromagnetic metal particles are used, ferromagnetic metal particles containing iron, cobalt or nickel and having a specific surface area ($S_{BET}$ method) of 42 m²/g or more and particularly preferably 45 m²/g or more, are preferred.

The examples of ferromagnetic metal particles include ferromagnetic metal particles having a metal content of 75 wt% or more and 80 wt% or more of the metal content being at least a kind of ferromagnetic metal or alloy (e.g., Fe, Co, Ni, Fe—Co, Fe—Ni, Co—Ni, Co—Ni—Fe) and alloys having another components in an amount of 20 wt% or less of the metal content (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). The above ferromagnetic metals may contain a slight amount of water, hydroxides or oxides.

The method for preparing these ferromagnetic particles is conventional, and ferromagnetic particles used in this invention can be prepared by a conventional method (for example, the method as described in *Chemistry and Industry of Magnetic Substance*, Tekumato K.K.).

The shapes of ferromagnetic particles are not particularly limited, and may be generally acicular, granular, dice-like, ellipsoidal and tabular. The acicular ferromagnetic particles are particularly preferred. The acicular ferromagnetic particles have an acicular ratio (long axis/short axis) of preferably from 3 to 20 and particularly preferably from 4 to 7.

The above-described resin component, hardening agents and ferromagnetic particles are mixed, kneaded and dispersed with a solvent generally used for preparing a magnetic coating composition (e.g., methyl ethyl ketone, dioxane, cyclohexane, ethyl acetate) to prepare a magnetic coating composition. Mixing, kneading and dispersing can be done in a conventional manner.

It is needless to say that conventionally used additives such as antistatic agents (e.g., carbon black), lubricating agents (e.g., fatty acid, fatty acid ester, silicon oil) or dispersing agents or filling agents may be included in the magnetic coating composition in addition to the above-described components.

A method for preparing a magnetic recording medium of this invention will be hereinafter illustrated. As described above, the thus-prepared magnetic composition is coated on a nonmagnetic support in the following manner. At first, a magnetic coating composition for an lower magnetic layer is prepared by mixing, kneading and dispersing the usual components for forming a magnetic layer. Such components usually include resin components, ferromagnetic particles, and optionally mixed hardening agents with a solvent. Then, in similar fashion, a magnetic coating composition for an upper magnetic layer is prepared by adding abrasive agents, which have a Mohs' hardness of 6 or more and have different average particle diameter, to the above-mentioned usual components for forming a magnetic layer.

The characteristic feature of the present invention's method for preparing a magnetic recording medium resides in coating a coating composition for an lower magnetic layer on a running nonmagnetic support, and while the coated lower layer is wet, successively coating thereon a coating composition for an upper magnetic layer so that the dry thickness of the upper magnetic layer is 1.5 $\mu$m or less (preferably 1.0 $\mu$m or less). That is, this method is referred to as a wet-on-wet coating method. When an extruding coating apparatus is, for example, used for continuously coating two layers, extruding coating apparatus are successively installed so that the nonmagnetic support may be put therebetween, or two extruding coating apparatuses are installed at a certain distance to such an extent that an upper layer can be coated while an lower layer is set (that is, the under-coated layer is adhesive because it still includes a solvent).

The coating apparatuses for coating the above-described magnetic coating compositions include an air doctor coating apparatus, a blade coating apparatus, a rod coating apparatus, an extruding coating apparatus, an air knife coating apparatus, a squeeze coating apparatus, an impregnating coating apparatus, a reverse roll coating apparatus, a transfer roll coating apparatus, a gravure coating apparatus, a kiss coating apparatus, a cast coating apparatus, a spray coating apparatus and a spin coating apparatus. In the practice of this invention, an extruding coating apparatus for simultaneously multiple coating having two slots as disclosed in Japanese Patent Application No. 62-124631 is preferred.

As described above, it is preferred that the upper magnetic layer have a thickness of 1.5 $\mu$m or less and more preferably 1.0 $\mu$m or less. In general, when two layers are provided, a coating composition for the lower magnetic layer is coated, and after it is dried, a coating composition for the upper magnetic layer is coated thereon. However, when the upper magnetic layer is provided after the lower magnetic layer is dried, it is difficult to obtain a uniformly thin layer having a thickness of 1.5 $\mu$m or less. In order to obtain such an extremely thin layer of 1.5 $\mu$m or less, it is preferred that the coating composition for the lower magnetic layer be coated, and while the coated lower layer is still wet, the coating composition for the upper magnetic layer is successively coated thereon.

The upper magnetic layer thus obtained in accordance with the above method is an extremely and uniformly thin magnetic layer having a thickness of 1.5 $\mu$m or less and having a excellent surface smoothness. As a result, a magnetic recording medium having both excellent running durability and excellent electromagnetic characteristics can be prepared.

The magnetic coating composition is coated so that the thickness of the magnetic layer (total thickness of the lower and upper magnetic layers) is generally from 0.5 to 10 $\mu$m and preferably from 2 to 6 $\mu$m.

A backing layer may be provided on the surface of a nonmagnetic support which is opposite to the surface coated with a magnetic coating composition. Such a backing layer is provided by coating onto said nonmagnetic support's opposite surface a coating composition for a backing layer. This composition comprises particle components such as abrasive agents, or antistatic agents and binders dispersed in an organic solvent. The method for preparing the backing layer used in the present invention is described in U.S. Pat. No. 4,567,063.

An adhesive layer may be provided on the surface of the nonmagnetic support to be coated with a magnetic coating composition, and an adhesive layer may also be provided on the surface to be coated with a coating composition for a backing layer.

Generally, a layer coated with a magnetic coating composition is subjected to the magnetic orientation to orientate ferromagnetic particles contained in the magnetic layer, and then the layer is dried.

After the coated layer is dried, it generally is subjected to the surface smoothing treatment. Surface smoothing treatment is conducted, for example, by a supercalender roll. The pores generated by removing the solvent upon drying disappear, and the packing density of ferromagnetic particles in the magnetic layer increases, whereby a magnetic recording medium having high electromagnetic characteristics can be obtained.

The laminated layer is then hardened and slit to a desired shape.

Cutting can be done under conventional conditions and in a conventional manner by a general cutting device such as a slitter or a cutting device.

A magnetic recording medium of this invention having two magnetic layers has been described hereinbefore, and as long as two magnetic layers having the above-described properties are provided, the total number of magnetic layers may be three or more.

This invention will be illustrated in more detail by the following examples and comparative examples. However, the present invention is not to be construed as being limited to these examples. In the following examples and comparative examples, all parts are by weight, unless otherwise mentioned.

EXAMPLE 1

| Coating composition for a lower magnetic layer | |
|---|---|
| Co-$\gamma$-Fe$_2$O$_3$ | 100 parts |
| (Hc: 650 Oe | |
| Specific surface area (S$_{BET}$): 35 m$^2$/g) | |
| Copolymer of vinyl chloride, vinyl | 12 parts |
| acetate and maleic anhydride | |
| (composition ratio: 86/13/1, | |
| Degree of polymerization: 400) | |
| Polyester polyurethane resin | 6 parts |
| Carbon black | 3 parts |
| Butyl stearate | 1 part |
| Stearic acid | 2 parts |
| Butyl acetate | 200 parts |
| Coating composition for an upper magnetic layer | |
| Co-$\gamma$-Fe$_2$O$_3$ | 100 parts |
| (Hc: 700 Oe, specific | |
| surface (S$_{BET}$): 40 m$^2$/g) | |
| Copolymer of vinyl chloride, vinyl | 12 parts |
| acetate and maleic anhydride | |
| (Composition ratio: 86/13/1, | |
| Degree of polymerization: 400) | |
| Polyester polyurethane resin | 6 parts |
| Carbon black | 3 parts |
| Abrasive agent A: $\alpha$-Al$_2$O$_3$ | 3 parts |
| (Average particle diameter: 0.5 $\mu$m) | |
| Abrasive agent B: $\alpha$-Al$_2$O$_3$ | 3 parts |
| (Average particle diameter: 0.2 $\mu$m) | |
| Butyl stearate | 1 part |
| Stearic acid | 2 parts |
| Butyl acetate | 200 parts |

Each of above compositions was mixed, kneaded and dispersed using a sand mill. 6 parts of polyisocyanate and 40 parts of butyl acetate were added to the thus-obtained dispersion and filtered using a filter having an average pore diameter of 1 $\mu$m to prepare a coating composition for the lower magnetic layer and that for an upper magnetic layer, respectively.

The coating compositions for the lower and the upper magnetic layers were coated in the following manner using a simultaneously multicoating extruding coating apparatus having two slots for the lower and the upper magnetic layers.

The thus-prepared coating composition for the lower magnetic layer was coated at a dry thickness of 3.0 $\mu$m on a polyethylene terephthalate support having a thickness of 14 $\mu$m and running at a speed rate of 60 m/min. using an extruding coating apparatus having a slot for forming the lower magnetic layer, and immediately thereafter (while the lower magnetic layer was wet), the coating composition for the upper magnetic layer was coated thereon at a dry thickness of 0.5 $\mu$m using an extruding coating apparatus having a slot for forming an upper magnetic layer. While the thus prepared composite magnetic layer was wet, it was subjected to orientation using the magnets having a magnetic force of 3000 gauss, dried and subjected to super calendering treatment, and then it was slit to ½ inch to prepare a video tape.

EXAMPLE 2

The same procedure as in Example 1 was repeated to prepare a video tape, except that $\alpha$-Al$_2$O$_3$ for the abrasive agent B having an average particle diameter of 0.1 $\mu$m instead of 0.2 $\mu$m was used in the coating composition for the upper magnetic layer.

EXAMPLE 3

The same procedure as in Example 1 was repeated to prepare a video tape except that $\alpha$-Al$_2$O$_3$ for the abrasive agent A having an average particle diameter of 0.7 $\mu$m instead of 0.5 $\mu$m was used in the coating composition for the upper layer.

EXAMPLE 4

The same procedure as in Example 3 was repeated to prepare a video tape except that $\alpha$-Al$_2$O$_3$ for the abrasive agent B having an average particle diameter of 0.1 $\mu$m instead of 0.2 $\mu$m was used in the coating composition for the upper magnetic layer.

EXAMPLE 5

The same procedure as in Example 1 was repeated to prepare a video tape, except that Cr$_2$O$_3$ having an average particle diameter of 0.5 $\mu$m was used as an abrasive agent A, and Cr$_2$O$_3$ having an average particle diameter of 0.2 $\mu$m was used as an abrasive agent B in the coating composition for the upper magnetic layer.

EXAMPLE 6

The same procedure as in Example 1 was repeated to prepare a video tape, except that Cr$_2$O$_3$ having an average particle diameter of 0.2 $\mu$m was used as an abrasive agent B in the coating composition for the upper magnetic layer.

EXAMPLE 7

The same procedure as in Example 1 was repeated to prepare a video tape, except that Cr$_2$O$_3$ having an average particle diameter of 0.5 $\mu$m was used as an abrasive agent A in the coating composition for the upper magnetic layer.

EXAMPLE 8

The same procedure as in Example 1 was repeated to prepare a video tape, except that the thickness of the upper magnetic layer was 1.8 $\mu$m instead of 0.5 $\mu$m.

EXAMPLE 9

The same procedure as in Example 8 was repeated to prepare a video tape, except that the coating composition for the lower magnetic layer was coated using an extruding coating apparatus, and after the lower layer was dired, the coating composition for the upper magnetic layer was coated using an extruding coating apparatus without using the simultaneously multicoating extruding coating apparatus.

COMPARATIVE EXAMPLE 1

The same procedure as in Example 9 was repeated to prepare a video tape, except that in the coating composition for the upper magnetic layer, 6 parts of $\alpha$-Al$_2$O$_3$ was used as an abrasive agent A instead of 3 parts thereof, and the abrasive agent B was not used in the coating composition for the upper magnetic layer.

COMPARATIVE EXAMPLE 2

The same procedure as in Example 9 was repeated to prepare a video tape, except that 6 parts of $\alpha$-$Al_2O_3$ was used as an abrasive agent B instead of 3 parts thereof in the coating composition for the upper magnetic layer, and the abrasive agent A was not used.

REFERENCE EXAMPLE 1

The same procedure as in Example 9 was repeated to prepare a video tape, except that the coating composition for lower magnetic layer was not coated, and only the coating composition for the upper magnetic layer was coated; that is, a single magnetic layer was formed.

REFERENCE EXAMPLE 2

The same procedure as in Comparative Example 1 was repeated to prepare a video tape, except that the coating composition for the lower magnetic layer was not coated and only the coating composition for the upper magnetic layer was coated to form a single magnetic layer.

REFERENCE EXAMPLE 3

The same procedure as in Comparative Example 2 was repeated to prepare a video tape, except that without coating the coating composition for the lower magnetic layer, only the coating composition for the upper magnetic layer was coated to form a single magnetic layer.

Regarding the video tapes prepared in the Examples and Comparative Examples, (i) the abrasive agents used in the upper magnetic layer, (ii) the average particle diameters of those abrasive agents, (iii) the additive amounts of the abrasive agents, (iv) the thickness of the upper layer, and (v) the physical properties of each tape were measured in the following manner and are shown in Table 1. Regarding the video tapes prepared in the Reference Examples, the same 5 items, (i)–(v), as mentioned above are shown in Table 2.

Measurement (1) Y.S/N (Signal to Noise Ratio of Brilliance Signal of Video)

S/N of luminance signals at 4 MHz was measured and shown in terms of relative values when the output level of the video tape prepared in Comparative Example 1 is assumed to be 0 dB.

(2) Still life

Signals recorded on each video tape were reproduced at a still mode, and the period of time for S/N of images on a screen to decrease by 6 dB was measured. The output level was measured using a "NV-870 HD type" output level measuring device manufactured by Matsushita Electric Industrial Co., Ltd.

(3) Head stain

Signals were recorded on tapes of 60 min. length using a commercially available tape deck "582 type" made by Nakamitchi Co., Ltd. Reproduction was repeatedly done 10 times, and the head stain was visually observed.

TABLE 1

|  | Abrasive agent A | | Abrasive agent B | | | | |
|---|---|---|---|---|---|---|---|
|  | Average particle diameter ($\mu$m) | Amount of abrasive agent A used (parts) | Average particle diameter ($\mu$m) | Amount of abrasive agent B used (parts) | Y S/N (dB) | Still life (min.) | Head stain |
| Examples | | | | | | | |
| 1 | 0.5 | 3 | 0.2 | 3 | 1.4 | 120 | none. |
| 2 | 0.5 | 3 | 0.1 | 3 | 1.5 | 120 | " |
| 3 | 0.7 | 3 | 0.2 | 3 | 1.3 | 120 | " |
| 4 | 0.7 | 3 | 0.1 | 3 | 1.4 | 120 | " |
| 5 | 0.5 | 3 | 0.2 | 3 | 0.9 | 120 | " |
| 6 | 0.5 | 3 | 0.2 | 3 | 1.2 | 120 | " |
| 7 | 0.5 | 3 | 0.2 | 3 | 1.0 | 120 | " |
| 8 | 0.5 | 3 | 0.2 | 3 | 0.7 | 100 | " |
| 9 | 0.5 | 3 | 0.2 | 3 | 0.6 | 80 | " |
| Comparative Examples | | | | | | | |
| 1 | 0.5 | 6 | — | — | 0.0 | 80 | none. |
| 2 | — | — | 0.2 | 6 | 0.6 | 40 | Stain was observed. |

TABLE 2

| Reference Examples | Abrasive agent A | | Abrasive agent B | | | | |
|---|---|---|---|---|---|---|---|
|  | Average particle diameter ($\mu$m) | Amount of abrasive agent A used (parts) | Average particle diameter ($\mu$m) | Amount of abrasive agent B used (parts) | Y S/N (dB) | Still life (min.) | Head stain |
| Examples | | | | | | | |
| 1 | 0.5 | 3 | 0.2 | 3 | −0.4 | 60 | Stain was slightly observed. |
| 2 | 0.5 | 6 | — | — | −1.2 | 80 | none. |
| 3 | — | — | 0.2 | 6 | 0.0 | 40 | Stain was observed. |

As is clearly seen from Table 1, a video tape of this invention, which has an upper magnetic layer containing (a) abrasive agents which have an average particle diameter of 0.25 $\mu$m or less and (b) abrasive agents which have an average particle diameter of 0.45 $\mu$m or more, exhibits (1) no decrease of Y-S/N, (2) long still life, and (3) no head stain. Therefore, this invention provides a magnetic recording medium having improved running durability without deteriorating electromagnetic characteristics. The above electromagnetic characteristics are particularly excellent in Examples 1 to 7 where the upper magnetic layer was prepared by a simultaneously multiple coating method and the upper magnetic layer had a thickness of 0.5 μm.

On the other hand, the tapes of Comparative Examples 1 and 2 which were prepared by a conventional successive multicoating method and which contain only one kind of an abrasive agent in its upper layer, fall short of this invention's excellence in both electromagnetic characteristics and running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a lower magnetic layer comprising ferromagnetic particles and binders and an upper magnetic layer comprising ferromagnetic particles and binders in this order, wherein the upper magnetic layer contains (a) an abrasive agent having a Mohs' hardness of 6 or more and an average particle diameter of 0.45 μm or more and (b) an abrasive agent having a Mohs' hardness of 6 or more and an average particle diameter of 0.25 μm or less, and wherein the amount of abrasive agents having Mohs' hardness of 6 or higher and contained in the upper magnetic layer is from 0.5 to 30 parts by weight per 100 parts by weight of the ferromagnetic particles contained in the upper magnetic layer.

2. A magnetic recording medium as claimed in claim 1, wherein the upper magnetic layer has a thickness of 1.5 μm or less.

3. A magnetic recording medium as claimed in claim 1, wherein the weight ratio of (a) abrasive agents contained in the upper magnetic layer having an average particle diameter of 0.45 μm or more and (b) those contained in the upper magnetic layer having an average particle diameter of 0.25 μm or less is between 1/5 and 5/1.

4. A magnetic recording medium as claimed in claim 1, wherein the lower magnetic layer contains no abrasive agents.

5. A magnetic recording medium as claimed in claim 1, wherein the upper magnetic layer contains (a) an abrasive agent having a Mohs' hardness of 6 or higher and an average particle diameter of from 0.5 to 1.0 μm, and (b) an abrasive agent having a Mohs' hardness of 6 or more and an average particle diameter of 0.2 μm or less.

6. A magnetic recording medium as claimed in claim 1 wherein the thickness of the lower magnetic layer is from 1 to 4 μm.

7. A magnetic recording medium as claimed in claim 1 wherein the abrasive agents contained in the upper magnetic layer are selected from the group consisting of $\alpha$-$Al_2O_3$ and $Cr_2O_3$.

8. A magnetic recording medium as claimed in claim 1 wherein the total thickness of the lower magnetic layer and the upper magnetic layer is from 0.5 to 10 μm.

* * * * *